(12) United States Patent
Cmielowski et al.

(10) Patent No.: US 11,048,577 B2
(45) Date of Patent: *Jun. 29, 2021

(54) AUTOMATIC CORRECTING OF COMPUTING CLUSTER EXECUTION FAILURE

(71) Applicant: International Business Machines Corporation, Armonk, NY (US)

(72) Inventors: Lukasz G. Cmielowski, Cracow (PL); Pawel Slowikowski, Cracow (PL); Rafal Bigaj, Cracow (PL); Bartlomiej Malecki, Slomniki (PL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/511,120

(22) Filed: Jul. 15, 2019

(65) Prior Publication Data

US 2019/0340061 A1 Nov. 7, 2019

Related U.S. Application Data

(63) Continuation of application No. 15/950,260, filed on Apr. 11, 2018, now Pat. No. 10,733,043.

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0721* (2013.01); *G06F 11/0751* (2013.01)

(58) Field of Classification Search
CPC ............. G06F 11/0793; G06F 11/0721; G06F 11/0751; G06F 11/079; G06F 11/0709;
(Continued)

(56) References Cited

U.S. PATENT DOCUMENTS 8,332,690 B1 12/2012 Banerjee et al.
9,069,737 B1* 6/2015 Kimotho ............. G06F 11/0793
(Continued)

FOREIGN PATENT DOCUMENTS

CN 106933659 A 7/2017

OTHER PUBLICATIONS

"Remediation of Hosts in a Cluster," https://pubs.vmware.com/vsphere-51/index.jsp#com.vmware.vsphere.update_manager.doc/GUID-90AA4FDB-B29B-4F7F-A400-38EFC4110024.html, VMware vSphere 5.1 Documentation Center, printed Feb. 23, 2018, pp. 1-3.
(Continued)

*Primary Examiner* — Joseph D Manoskey
(74) *Attorney, Agent, or Firm* — Jared L. Montanaro

(57) ABSTRACT

A processor may identify, using historical data, an amount of computing resources consumed to remedy the failure with an automatic remedy step. The processor may determine that the amount of consumed computing resources to remedy the failure is less than an amount of computing resources consumed by restarting the process. The processor may perform the automatic remedy step. The processor may identify that the automatic remedy step has failed. The processor may determine a waiting period based on an estimated time to receive a user response to the failure and an estimated load on the computing cluster. The processor may display a generated alert to a user during the waiting period. The processor may identify that no user input has been received during the waiting period. The processor may release computing resources corresponding to the process.

12 Claims, 4 Drawing Sheets

(58) Field of Classification Search
CPC ............. G06F 11/0766; G06F 11/3006; G06F 11/3055; G06F 11/3051
See application file for complete search history.

(56) References Cited

U.S. PATENT DOCUMENTS

| | | |
|---|---|---|
| 9,684,866 B1 * | 6/2017 | Todd, Jr. ............... G06F 9/5072 |
| 2009/0307166 A1 | 12/2009 | Routray et al. |
| 2012/0096320 A1 | 4/2012 | Caffrey |
| 2013/0117231 A1 | 5/2013 | Sridharan et al. |
| 2014/0006844 A1 | 1/2014 | Alderman et al. |
| 2015/0236896 A1 | 8/2015 | Brown et al. |
| 2016/0350173 A1 | 12/2016 | Ahad |
| 2017/0279702 A1 * | 9/2017 | Mah .................... G06F 11/0703 |
| 2019/0213099 A1 | 7/2019 | Schmidt et al. |

OTHER PUBLICATIONS

Huang et al., "Differentiated Failure Remediation with Action Selection for Resilient Computing," http://ieeexplore.ieee.org/document/7371863/?reload=true, 2015 IEEE 21st Pacific Rim International Symposium on Dependable Computing, pp. 199-208, ©2015 IEEE.

Mell et al., "The NIST Definition of Cloud Computing," Recommendations of the National Institute of Standards and Technology, U.S. Department of Commerce, Special Publication 800-145, Sep. 2011, 7 pgs.

Cmielowski et al., "Automatic Correcting of Computing Cluster Execution Failure," U.S. Appl. No. 15/950,260, filed Apr. 11, 2018.

List of IBM Patents or Patent Applications Treated as Related, Jul. 12, 2019, 2 pgs.

* cited by examiner

AUTOMATIC CORRECTING OF COMPUTING CLUSTER EXECUTION FAILURE

BACKGROUND

The present disclosure relates to the field of digital computer systems, and more specifically to automatically acting upon a failure in execution of a process on a computing cluster.

Machine learning explores the study and construction of algorithms that can learn from and make predictions on data by making data-driven predictions or decisions, through building a model from sample inputs. Computer clusters are usually used for such processing, but the processing time is still relatively long and may take weeks.

SUMMARY

Embodiments of the present disclosure include a method, computer program product, and system for acting upon a failure in execution of a process on a computing cluster. A processor may identify, using historical data, an amount of computing resources consumed to remedy the failure with an automatic remedy step. The processor may determine that the amount of consumed computing resources to remedy the failure is less than an amount of computing resources consumed by restarting the process. The processor may perform the automatic remedy step. The processor may identify that the automatic remedy step has failed. The processor may determine a waiting period based on an estimated time to receive a user response to the failure and an estimated load on the computing cluster. The processor may display a generated alert to a user during the waiting period. The alert may include a prompt for user input regarding the user response to the failure. The processor may identify that no user input has been received during the waiting period. The processor may release computing resources corresponding to the process.

The above summary is not intended to describe each illustrated embodiment or every implementation of the present disclosure.

BRIEF DESCRIPTION OF THE DRAWINGS

In the following embodiments of the disclosure are explained in greater detail, by way of example only, making reference to the drawings in which.

Figure 1:
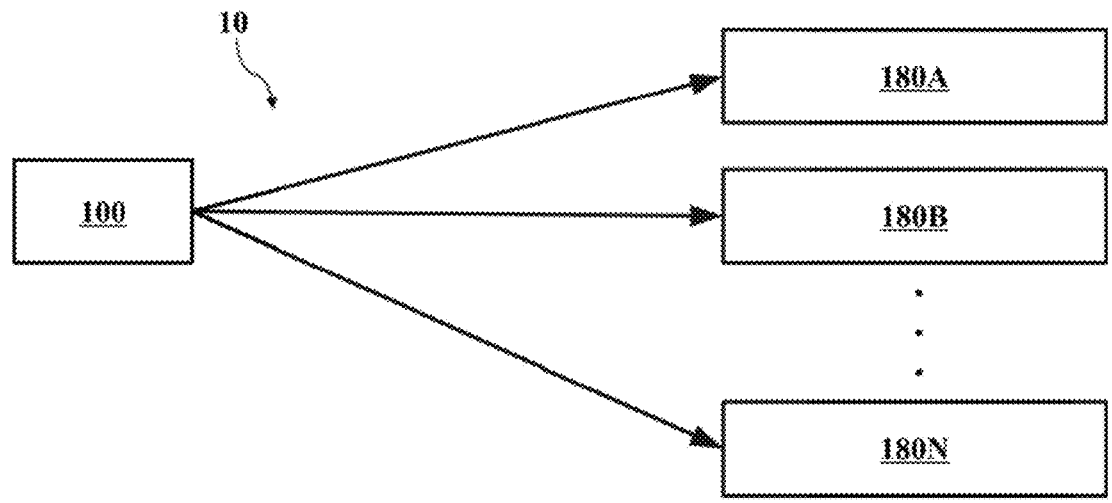
FIG. 1 illustrates an example of a computing cluster.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "cost" refers to an amount of computing resources and/or resource usage within a computing system or device or cluster (e.g., processors, registers, memory, etc.). The cost may for example be derived from the number of instructions, the numbers of seeks and page transfer, the memory usage, the bandwidth etc.

Machine learning explores the study and construction of algorithms that can learn from and make predictions on data by making data-driven predictions or decisions, through building a model from sample inputs. The execution of the learning requires a hardware that can perform parallel operations in order to reduce the processing time. Computer clusters are usually used for such processing, but the processing time is still relatively long and may take weeks. Thus, there is a continuous need to optimize the processing of the learning in such clusters.

Various embodiments provide a method for acting upon a failure in execution of a process on a computing cluster, computer system and computer program product as described by the subject matter of the independent claims. Advantageous embodiments are described in the dependent claims. Embodiments of the present disclosure can be freely combined with each other if they are not mutually exclusive.

The present method may enable a processor to automatically react on failures in a process running/executing on a computing cluster. This may reduce the overall time required for executing a process, including the time for fixing potential failures in the process. Another advantage may be that the cost for remedying the failures is reduced to a minimum (e.g., the amount of computing resources may be decreased in remedying the failures).

In one aspect, the disclosure relates to a method for acting upon a failure in execution of a process on a computing cluster. The method comprises, upon the failure in process execution: determining using historical resource data as a remedy cost the resource consumption required to remedy said failure with an automatic remedy step; if the remedy cost is lower than a restart cost for restarting the process, performing the automatic remedy step, otherwise restarting the process; if the automatic remedy step is performed and fails, determining a waiting period based on an estimated time to receive a user response to the failure, and an estimated load on the computing cluster; issuing an alert, and waiting for a user input for the waiting period, and if during said waiting period no user input is received, freeing resources of the process.

In another aspect, the disclosure relates to a computer program product comprising a computer-readable storage medium having computer-readable program code embodied therewith, the computer-readable program code configured to implement all of steps of the method according to preceding embodiments.

In another aspect, the disclosure relates to a computer system for acting upon a failure in execution of a process on a computing cluster. The computer system is configured for, upon the failure in process execution: determining using historical resource data as a remedy cost the resource consumption required to remedy said failure with an automatic remedy step; if the remedy cost is lower than a restart cost for restarting the process, performing the automatic remedy step, otherwise restarting the process; if the automatic remedy step is performed and fails, determining a waiting period based on an estimated time to receive a user response to the failure and an estimated load on the computing cluster; issuing an alert, and waiting for a user input for the waiting period, and if during said waiting period no user input is received, freeing resources of the process.

The present disclosure relates to a method for acting upon a failure in execution of a process on a computing cluster. The method comprises, upon the failure in process execution: determining using historical resource data as a remedy cost the resource consumption required to remedy said failure with an automatic remedy step. If the remedy cost is lower than a restart cost for restarting the process, the automatic remedy step may be performed, otherwise the process may be restarted. If the automatic remedy step is performed and fails, a waiting period may be determined based on an estimated time to receive a user response to the failure and an estimated load on the computing cluster. An alert may be issued for waiting for a user input for the waiting period. If during said waiting period no user input is received, resources of the process may be freed.

According to one embodiment, the method further comprises setting, by way of a processor, a timer that uses the waiting period for maintaining a job of the process scheduled for the waiting period. Setting the timer may enable a systematic and controlled execution of the process. For example, this may prevent an unlimited or very long waiting time period until the failure is fixed. For another example, a processor may identify that a failure has occurred in a computing cluster and be programmed to automatically begin correcting the failure. However, if the processor cannot correct the failure within three minutes, the processor may additionally be programmed to alert the user of the failure (e.g., indicating that a hardware malfunction has occurred, etc.). As such, the processor may set a three-minute timer while simultaneously beginning to correct the failure.

According to one embodiment, the method further comprises the processor adding one or more artificial tasks for the job and executing the artificial tasks during the waiting period. The artificial task may be a keep-alive operation. The artificial task may for example comprise one or more NOP (e.g., no operation) instructions. Some resources (e.g., a kernel) are designed to auto-dispose after some grace period, so if there are no incoming requests of a given, running process it will be removed. This embodiment enables to maintain some artificial activity while investigation or resolution of the failure is in progress in order to avoid deletion of the process.

According to one embodiment, the freeing of the resources (e.g., computing resources) of the process comprises restarting the process. The restarting of the process may automatically be performed or triggered by a user and/or a processor upon the expiration of the timer set to the waiting period.

For example, the freeing of the resources comprises releasing allocated resources of the process such that they can be reallocated for use by another process. The resources may comprise memory space used to store data of the process, e.g., if resources are the memory space of data of the process in memory, such data may be deleted in order to free the resources for use by another (e.g., a second, third, subsequent, etc.) process. If resources comprise a software object, then resources may be freed by destroying the object. If a network connection is associated with the process, the freeing of resources comprises closing that network connection.

According to one embodiment, the process comprises multiple execution stages. The method further comprises restarting the process or saving the results of already executed parts of the process and stopping the process based on the execution stage of the process at which the failure is occurred. For example, by just knowing the stage at which the failure has occurred, the decision may be taken by a processor to save the results or restart the process without additional computations (e.g., thus correcting the execution failure with the additional computations upon restart). For example, if the stage at which the failure occurs is the first stage, it may be more efficient to restart the process immediately rather than computing all costs for deciding on what action to perform to solve the failure. This may be because more computing resources will be allocated to determining a solution than the resources allocated to execute the first stage of the process.

According to one embodiment, the method further comprises, in case the current utilization of the computing cluster is higher than a predefined threshold, saving the results of already executed parts of the process and stopping the process. This embodiment may enable a processor to decide to interrupt investigations of an execution failure and may enable the processor to store intermediate results, e.g., if current utilization of the cluster is high. That is, the processor may store already executed parts (e.g., stages) of the process if the cluster is already using allocating a majority of associated computing resources. The process may, for example, be restored when there are more resources available.

According to one embodiment, in case the estimated load (e.g., the estimated amount of computing resources needed for the failed process) on the computing cluster is smaller than a predefined maximum load (e.g., the actual amount of computing resources available for the process), the waiting period is equal to the estimated time to receive the user response to the failure, otherwise the waiting period is equal to the estimated time weighted by a predefined value smaller than 1. Depending on the available resources at the computer cluster the waiting time period may be adapted accordingly. This may prevent a processor from penalizing other processes of the computer cluster while correcting the failed process.

According to one embodiment, the method further comprises evaluating one or more resource parameters associated with each of the execution stages of the process and updating historical resource data in a repository (e.g., database, etc.) accordingly. For example, after execution of each stage of the process, resource parameters such as CPU cycles, memory usage and bandwidth used for that that execution may be saved in the historical resource data. This may enable an up to date historical data and thus an improved failure remedy process.

According to one embodiment, the method further comprises a processor determining a waiting cost based on the estimated time to receive the user response to the failure and the estimated load on the computing cluster; and if the waiting cost is lower than said restart cost, generating and issuing of an alert. Otherwise the process is restarted. The waiting cost determination and comparison may be performed before determining a waiting time period. For example, the waiting time period may only be determined if the waiting cost is lower than said restart cost. The waiting cost may for example indicate the cost for processing the remaining stages of the process (e.g., following the failure). In one example, the waiting cost may, in addition, comprise the current load of the cluster (e.g., the amount of computing resources currently being used by the cluster).

According to one embodiment, the process is a machine learning process, wherein the failure comprises one (or all) of: malformed training data, network connectivity failure, authorization failures, expired tokens, misconfigurations. According to one embodiment, the process comprises multiple execution stages, wherein the historical resource data comprises resource costs associated to each execution stage, wherein the remedy cost is determined using resource costs associated with the stage of execution of the process at which the failure occurred. The resource costs of a given execution stage may comprise the costs for executing the stage and/or costs for fixing or remedying different type of failures at the given stage, etc. This may enable an accurate cost estimation and optimal processing decision when a failure is occurred.

Turning now to FIG. 1 that illustrates an example of a computing cluster 10, in accordance with embodiments of the present disclosure. As shown in FIG. 1, the computing cluster 10 includes a coordination or master node 100 and multiple operation or slave nodes 180A-N. The operation nodes 180A-N may be used to implement a distributed computing environment. The operation nodes 180A-N may be connected via a network, which may be any combination of wired and/or wireless networks. Each of the operation nodes 180A-N provides the storage, networking, memory, and processing resources. Each operation node 180A-N may be configured to process a respective task of a given process and send the result of the execution of the respective task to the coordination node 100 to integrate the results obtained by different operation nodes. For example, operation node 180A may relay the result of its personalized execution process to the coordination node 100, which may integrate the result obtained by operation node 180A to operation nodes 180B-N.

The computing cluster 10 may, for example, comprise a cluster capable of processing data sets and processing jobs. The computing cluster 10 may be provided with one or more kernels. A kernel may be an interactive shell for the computing cluster 10 that provides a means of interaction with the underlying cluster and also provides isolation. For example, there may be multiple active kernels on the computing cluster 10 and objects created in one kernel may not be visible in other kernels. A process of the computing cluster 10 may be running within its kernel. For example, in case of a failure of the process a connection to the corresponding kernel may be performed and predefined correcting commands may be run such as modifying broken configuration or removing incorrect rows from some data set, etc.

Figure 2:
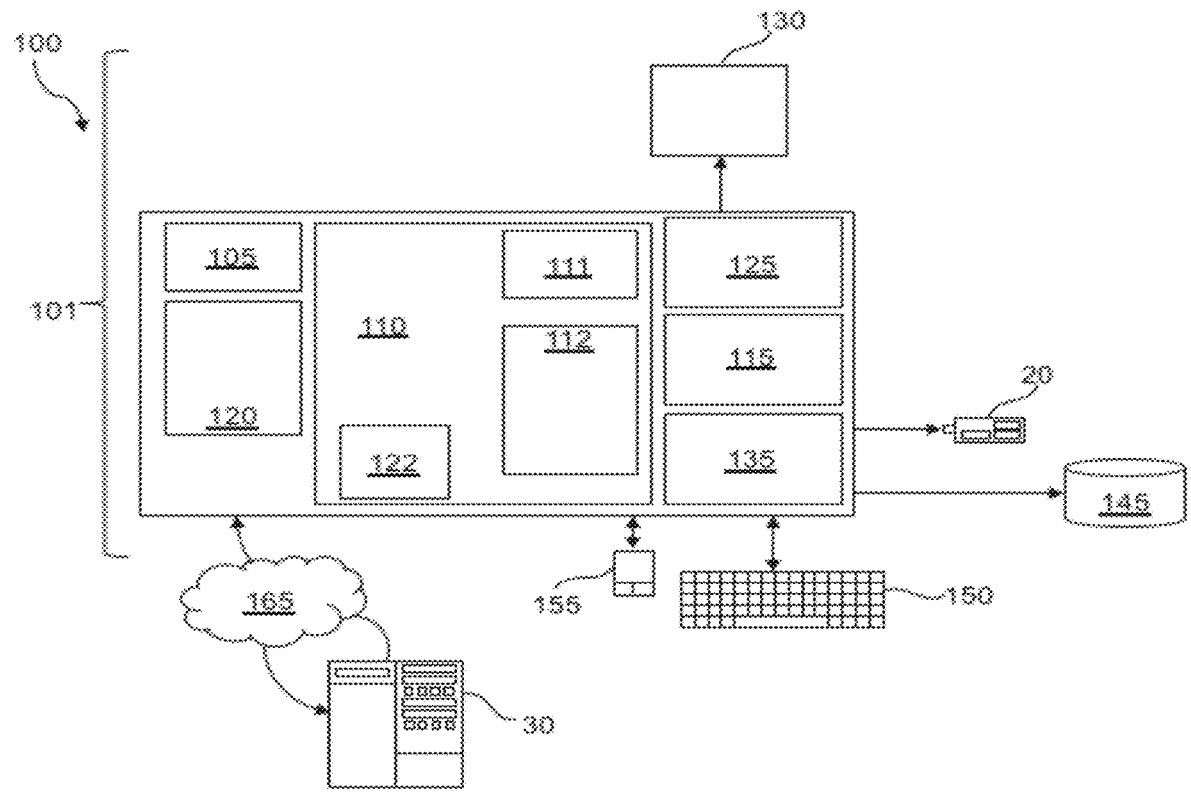
FIG. 2 represents a computerized system, suited for implementing one or more method steps as involved in the present disclosure.

Referring now to FIG. 2 that represents the coordination node 100 of FIG. 1 as a general computerized system, suited for implementing method steps as involved in the disclosure.

It will be appreciated that the methods described herein are at least partly non-interactive, and automated by way of computerized systems, such as servers or embedded systems. In exemplary embodiments, the methods described herein can be implemented in a (partly) interactive system. These methods can further be implemented in software 112 and 122 (e.g., including firmware), processor (hardware) 105, or a combination thereof. In exemplary embodiments, the methods described herein are implemented in software, as an executable program, and are executed by a special-purpose digital computer, such as an optimized/automated personal computer, workstation, minicomputer, or mainframe computer. The most general system of coordination node 100 therefore includes a computer 101 that is a general-purpose computer augmented into a special-purpose digital computer.

In exemplary embodiments, in terms of hardware architecture, as shown in FIG. 2, the computer 101 includes the processor 105, a memory (main memory) 110 coupled to a memory controller 115, and one or more input and/or output (I/O) devices (or peripherals) 20 and 145 that are communicatively coupled via a local input/output controller 135. The local input/output controller 135 can be, but is not limited to, one or more buses or other wired or wireless connections, as is known in the art. The local input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20 and 145 may generally include any generalized cryptographic card or smart card known in the art.

The processor 105 is a hardware device for executing software, particularly that stored in the memory 110. The processor 105 can be any custom made or commercially available processor, a central processing unit (CPU), an auxiliary processor among several processors associated with the computer 101, a semiconductor-based microprocessor (e.g., in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this disclosure. In the example of FIG. 2, software in the memory 110 includes instructions associated to the software 112, e.g., instructions to manage databases such as a database management system. The memory 110 may further comprise a query optimizer. The query optimizer may comprise instructions, e.g., software instructions that when executed may provide a query execution plan for executing a given query.

The software in memory 110 also typically includes a suitable operating system (OS) 111. The OS 111 controls the execution of other computer programs, such as the software 112 for implementing the methods as described herein.

The methods described herein may be in the form of a source program, executable program (object code), script, or any other entity comprising a set of instructions to be performed. When the methods described herein are in the form of a source program, then the source program needs to be translated via a compiler, assembler, interpreter, or the like, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

In exemplary embodiments, a conventional keyboard 150 and mouse 155 can be coupled to the local input/output controller 135. Other output devices such as the I/O device 145 may include input devices, for example but not limited to a printer, a scanner, microphone, and the like. Finally, the I/O devices 20 and 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 20 and 145 can be any generalized cryptographic card or smart card known in the art. The coordination node 100 can further include a display controller 125 coupled to a display 130. In exemplary embodiments, the coordination node 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part, or all of the steps of the methods discussed herein. In exemplary embodiments, the network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a workstation, intelligent device or the like, the software in the memory 110 may further include a basic input output system (BIOS). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software 112. The methods described herein and the OS 111, in whole or in part, but typically the latter, are read by the processor 105, possibly buffered within the processor 105, and then executed.

When the systems and methods described herein are implemented in software 112, as is shown in FIG. 2, the methods can be stored on any non-transitory computer readable medium, such as storage 120, for use by or in connection with any computer related system or method. The storage 120 may comprise a disk storage such as HDD storage.

Figure 3:
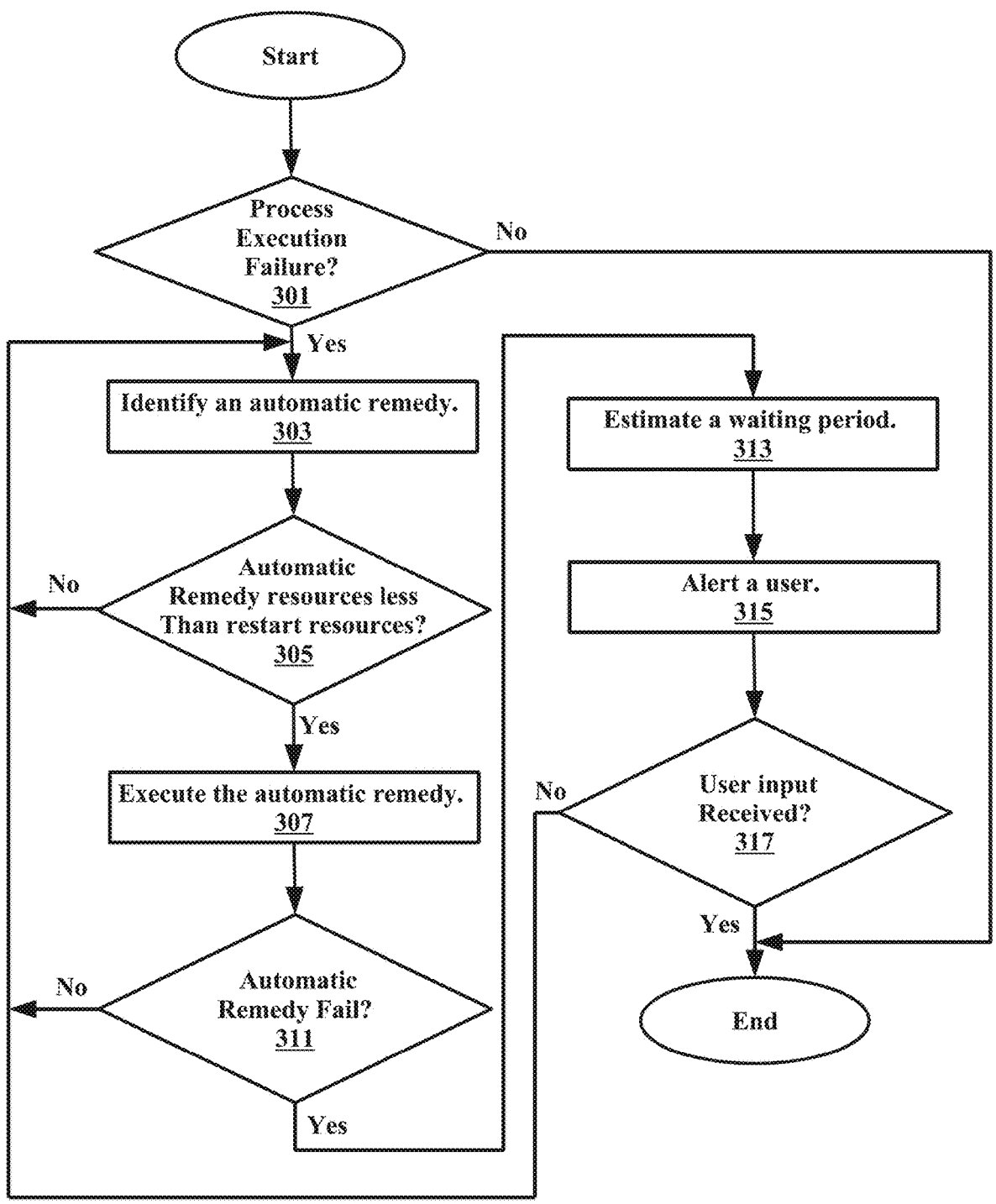
FIG. 3 is a flowchart of a method for acting upon a failure in execution of a process on a computing cluster.

Referring now to FIG. 3, illustrated is a flowchart of an example method 300 for acting upon a failure in execution of a process on a computing cluster. In some embodiments, the failure in execution of the process on the computing cluster, may be on the computer cluster 10 of FIG. 1. The process may for example be machine learning process having multiple execution stages such as the stages of: loading a model; loading a training data set; loading a feedback data set; calculating metrics on the model versus feedback data set; preparing retraining data set (e.g., feedback and training data sets); loading a pipeline for the model; and retraining the pipeline.

Each execution stage of the process may be associated with respective processing information. The processing information may comprise processing resources costs and resources required for the execution of the execution stage. For example, the processing information may comprise an ID of a kernel, a list of used variables in that kernel, libraries etc. Each of the resources such as memory may have its own historical cost (e.g., recorded averages of the amount of computing resources used) for each of the execution stages. The processing resource costs may be a historical cost. The historical cost may be expressed in terms of fixed values or may be the output of a predefined function, e.g., a function of feedback data size.

The historical cost may be derived from previous executions of each of the execution stage. The processing information may be updated after each execution of an execution stage. For example, a monitoring context for the process may be established and as long as the execution of a given execution stage does not fail. The monitoring context may update the execution cost associated with that execution stage. For example, the current execution cost may be combined (e.g., averaged) with the cost already associated with the execution stage or the current execution cost may replace the cost that is already associated with the execution stage.

Each execution stage may further be associated with a list of potential failures that can occur during the execution of that execution stage. For example, the list of potential failures may comprise: connectivity issues with some required services such as external databases, malformed feedback data required for data preparation stage. And each failure may be associated with a predefined algorithm for inspecting and/or remedying the failure, e.g., the algorithm may comprise an inspection step and a remedy step and/or a list of commands to be executed, e.g., on a kernel of the process. The algorithm may for example indicate to: retry connection or try alternative resource; check for known malformation in data and fix them or remove faulty rows, etc. At least part of the algorithm may, for example, automatically be executable, e.g., the remedy step may automatically be executed. Each of the potential failures of the list may further be associated with resources costs that may be needed for inspecting and/or remedying the failure.

A cost may, for example, be quantified using a cost vector: [CPU cycles, memory consumption, bandwidth consumption] having three elements indicative of the CPU cycles, memory consumption and bandwidth consumption respectively.

The processing information and the list of potential failures of each of the execution stage may be provided as historical resource data that may for example be stored on storage 120 of FIG. 2.

In some embodiments, the method 300 may begin at decision block 301. In some embodiments, a computer system and/or processor may perform the functions of the method 300. At decision block 301, it may be determined (e.g., by a processor) if a failure in process execution of a process has occurred. If no process execution failure has occurred, the method 300 may end. If a process execution failure has occurred, the method 300 may proceed from decision block 301 to operation 303. At operation 303, an automatic remedy may be identified by using historical resource data as a remedy cost. The remedy cost may be the resource consumption required to remedy the failure. For example, it may be determined at which execution stage the failure has occurred and using a list of potential failures in the historical resource data, an automatic remedy step and associated remedy cost of the current failure may be determined. For example, the cost for a network reconnection may be: [20, 100 Kb, 10 Kb] (e.g., a cost vector of [CPU cycles, memory consumption, bandwidth consumption]).

After operation 303, the method 300 may proceed to decision block 305, where it may be determined if the automatic remedy resources are less than the restart resources (e.g., if the computing resources used by the automatic remedy step are less than the computing resources used to restart the process). If it is determined at decision block 305 that the automatic remedy resources are more than the restart resources, the method 300 may revert back to operation 303 in order to identify another automatic remedy that may correct the failure, or the method 300 may restart the execution of the process. If it is determined at decision block 305 that the remedy cost is lower than the restart cost for restarting the process, the method 300 may proceed to operation 307. At operation 307, the automatic remedy step may be executed.

After operation 307, the method 300 may proceed to decision block 311, where it may be determined if the automatic remedy failed. If it is determined at decision block 311 that the automatic remedy failed, the method 300 may revert back to operation 303 in order to identify another automatic remedy that may correct the failure, or the method 300 may restart the execution of the process. If it is determined at decision block 311 that the automatic remedy step has failed, the method 300 may proceed to operation 313.

At operation 313, a waiting period may be estimated (e.g., by a processor). In some embodiments, the waiting period may be based on an estimated time to receive a user response to the failure and an estimated load on the computing cluster. In some embodiments, the waiting period may be the time to wait for receiving user input with regard to the failure. In one example, the waiting period may be determined and used in response to determining that a waiting cost is lower than the restart cost for restarting the process. The waiting cost may be based on an estimated likelihood that a user will respond to an alert of the failure, an estimated time to receive the user response to the alert of the failure, and an estimated load on the computing cluster. If the waiting cost is higher than the restart cost the process may be restarted.

Following the above example, the execution of the process may fail in execution stage 5, and the estimated time to react (ETTR) to the failure by a user may be determined. For example, the estimated time may be ETTR=240 min. In one embodiment, the waiting period may be the time to wait for reaction (TTWFR). That is, TTWFR=ETTR.

In another example, TTWFR may be determined as follows. The cost vector associated with each of the execution stages 1-4 may be determined, e.g., using historical resource data. For example, the cost vector $C_i$ for each of the stages i=1-4 may be: C1:[200, 400 Kb, 300 Kb]; C2:[50000, 600000 Kb, 600000 Kb]; C3:[30000, 200000 Kb, 200000 Kb]; C4:[1500, 700 Kb, 0 Kb]. Thus, the cost vector for performing all stages 1 to 4 is [81700, 801100 Kb, 800300 Kb].

Using the historical resource data, the estimated cost to execute the remaining stages 5-7 of the process may be determined. For example, that estimated cost may be [20000, 1000 Kb, 100 Kb] (e.g., as determined by adding each of the historical cost vectors associated with each of the stages 5-7).

Since the estimated cost is significantly smaller than the cost already spent for stages 1 to 4 (e.g., the estimated cost is smaller than the restart cost for restarting the process), the waiting period may be determined and used to wait for user feedbacks.

Current usage and demand of the computing cluster may be determined. The current usage and demand may be quantified using at least one of the elements of the cost vector, e.g., memory usage. The current demand and usage may be compared with the estimated cost [20000, 1000 Kb, 100 Kb]. If there is no shortage, e.g., the estimated cost and the current usage and demand may be supported or provided by the computing cluster, the waiting time period (TTWFR) may be equal to ETTR; otherwise if, e.g., the available memory on the cluster is getting low or there is ongoing peak the TTWFR can be defined as TTWFR=W*ETTR, where 0≤W<1. In another example, assume that 100 GB of memory is available on the computing cluster, ongoing jobs are estimated to take 80 GB at peak times and memory consumed by a failed process is 25.6 GB. In this case, the amount of reserved memory as a percent of estimated demand=(25.6 (GB)/80 (GB))*100=32% of demand as a percent of total memory available=(80 (GB)/100 (GB))*100=80%. Thus W=32%/80%=0.4 and TTWRF=0.4*ETTR.

After operation 313, the method 300 may proceed to operation 315. At operation 315, an alert may be issued, e.g., for alerting a user of the failure. In some embodiments, the alert may be issued to a user in order to indicate that user input in regard to the failure is required during the waiting period. After operation 315, the method 300 may proceed to decision block 317, where it may be determined if user input is received during the waiting period. If it is determined, at decision block 317, that no user input is received during the waiting period, the method 300 may revert back to operation 303 in order to identify another automatic remedy that may correct the failure, or the method 300 may restart the execution of the process.

If, at decision block 317, it is determined that the user input has been received, the method 300 may end. In some embodiments, the method 300 may end after decision block 317 by identifying that the user input has fixed the failure and the execution of the process may continue from the point where the failure occurred (e.g., following the example above, stages 1-4 may not be re-executed, however, stage 5 and the following stages may be executed) without need to restart the whole process.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
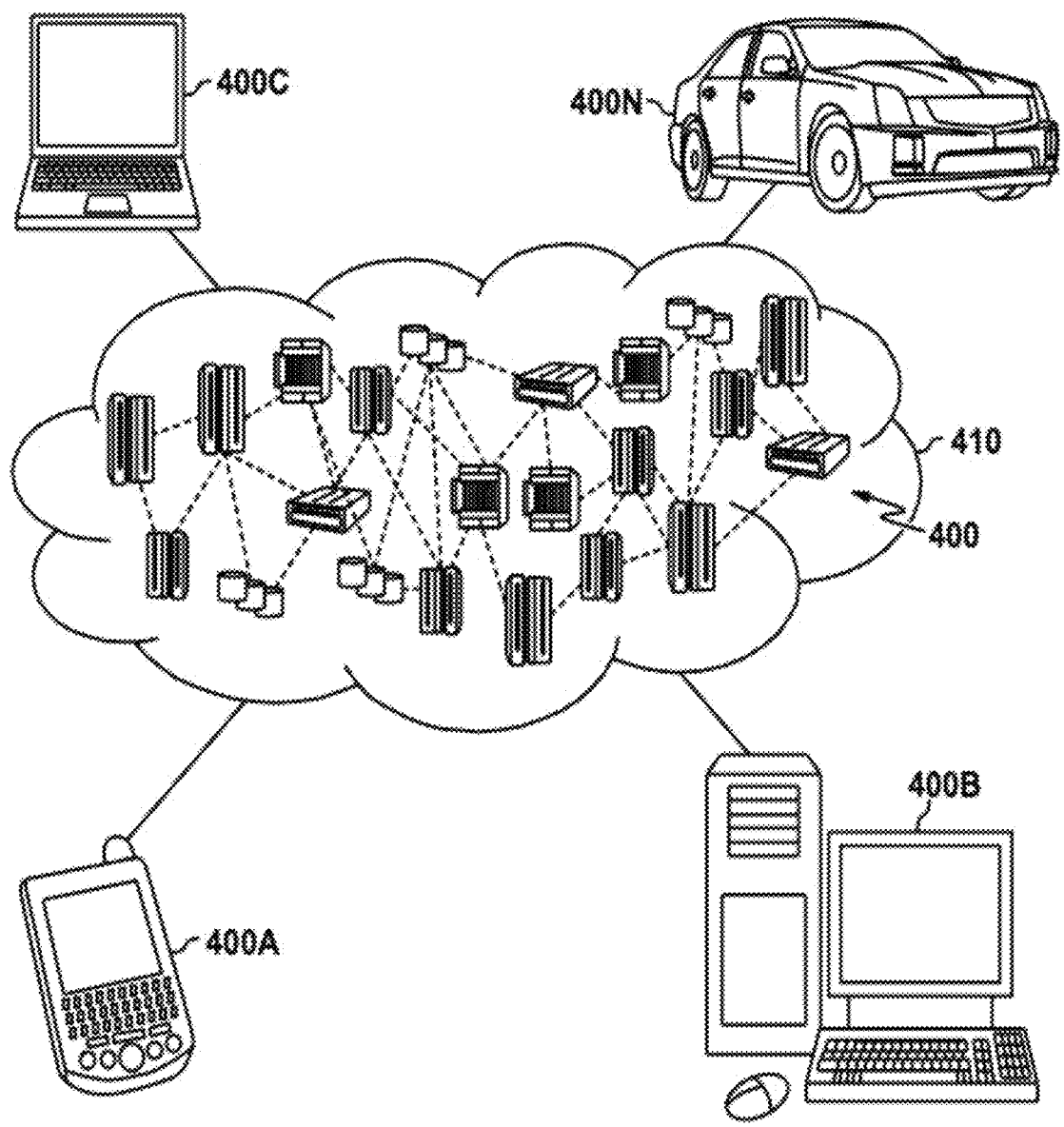
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
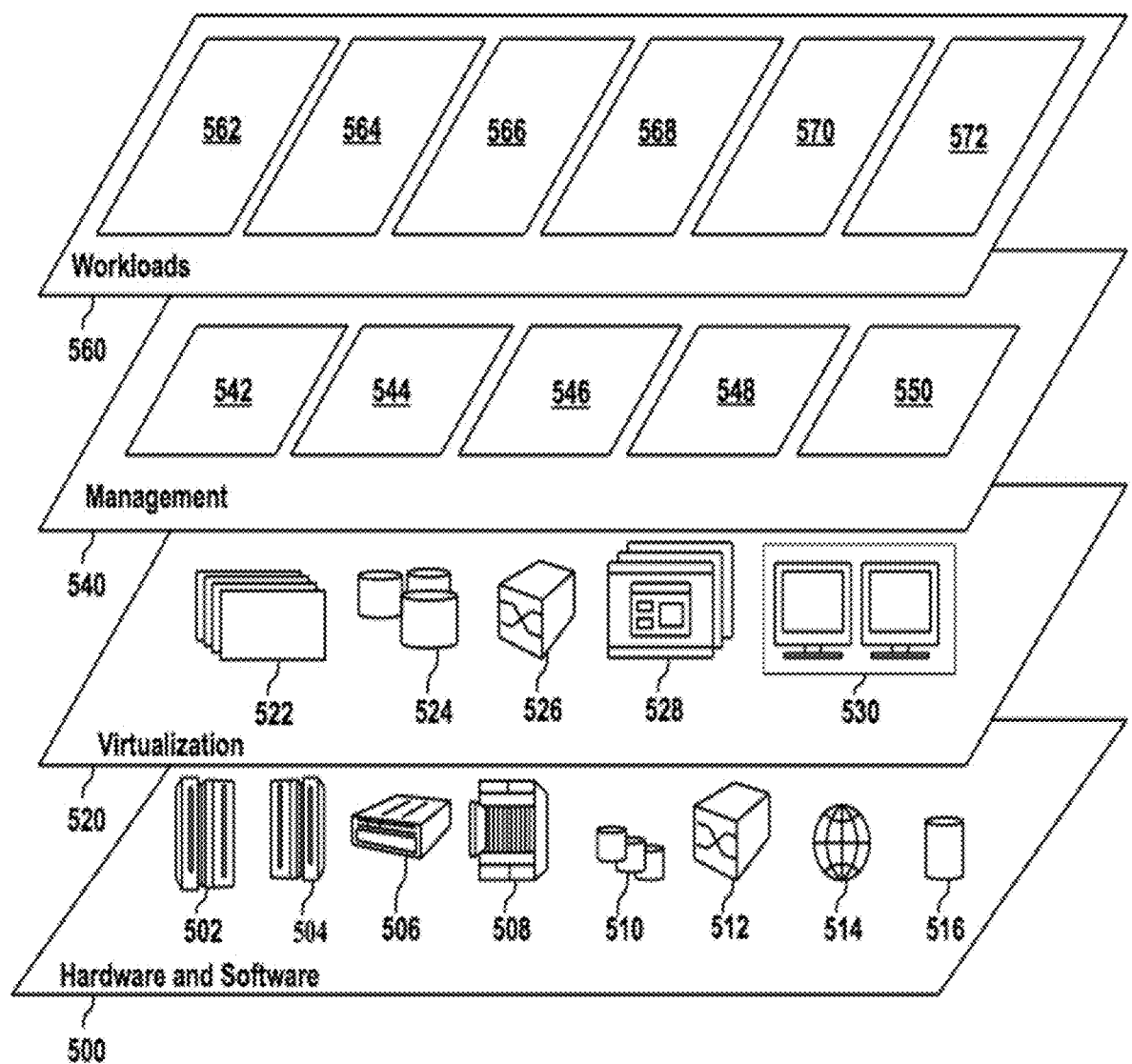
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and automatically correcting an execution failure in a computing cluster 572.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for acting upon a failure in execution of a process on a computing cluster, comprising:
identifying, using historical resource data, an amount of computing resources consumed to remedy the failure with an automatic remedy step;
determining that the amount of consumed computing resources to remedy the failure is less than an amount of computing resources consumed by restarting the process;
performing the automatic remedy step;
identifying that the automatic remedy step has failed;
determining a waiting period based on an estimated time to receive a user response to the failure and an estimated load on the computing cluster;
displaying a generated alert to a user during the waiting period, wherein the alert includes a prompt for user input regarding the user response to the failure;
identifying that no user input has been received during the waiting period; and
releasing computing resources corresponding to the process.

2. The method of claim 1, further comprising:
generating a timer, wherein the timer maintains a first function of the process during the waiting period.

3. The method of claim 2, further comprising:
generating one or more substitute tasks for the first function; and
executing the one or more substitute tasks during the waiting period.

4. The method of claim 1, wherein permitting the release of computing resources corresponding to the process comprises restarting the process.

5. The method of claim 1, wherein the process includes multiple execution stages, and wherein the method further comprises:
saving results of already executed stages of the process before permitting the release of computing resources;
restarting the process; and
stopping the process based on the execution stage of the process at which the failure occurred.

6. The method of claim 1, further comprising:
saving, in response to a current utilization of the computing cluster being higher than a predefined threshold, the results of already executed parts of the process; and
stopping the process.

7. The method of claim 1, wherein the waiting period is equal to the estimated time to receive the user response to the failure when the estimated load on the computing cluster is smaller than a predefined maximum load.

8. The method of claim 1, wherein the waiting period is equal to the estimated time to receive the user response to the failure weighted by a predefined value smaller than 1 when the estimated load on the computing cluster is larger than the predefined maximum load.

9. The method of claim 1, further comprising:
evaluating one or more resource parameters associated with the process; and updating the historical resource data based on the evaluation of the one or more resource parameters.

10. The method of claim 1, further comprising:
determining a waiting cost based on the estimated time to receive the user response to the failure and the estimated load on the computing cluster, wherein the waiting cost is the amount of computing resources consumed during the waiting period;
identifying that the waiting cost is lower than the amount of computing resources consumed by restarting the process; and
issuing the alert.

11. The method of claim 1, wherein the process is a machine learning process, and wherein the failure is malformed training data, network connectivity failure, misconfiguration failure, and authentication failure.

12. The method of claim 1, wherein the process includes multiple execution stages, wherein the historical resource data comprises an amount of consumed computing resources associated with each execution stage, and wherein the amount of consumed computing resources to remedy the failure is determined using the amount of consumed computing resources associated with the stage of execution of the process at which the failure occurred.

* * * * *